US009852381B2

(12) United States Patent
Boldyrev et al.

(10) Patent No.: US 9,852,381 B2
(45) Date of Patent: Dec. 26, 2017

(54) METHOD AND APPARATUS FOR PROVIDING BEHAVIORAL PATTERN GENERATION FOR MIXED REALITY OBJECTS

(71) Applicant: Nokia Technologies Oy, Espoo (FI)

(72) Inventors: Sergey Boldyrev, Söderkulla (FI); Jari-Jukka Harald Kaaja, Järvenpää (FI); Mikko Aleksi Uusitalo, Helsinki (FI); Ian Justin Oliver, Söderkulla (FI); Vesa-Veikko Luukkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 411 days.

(21) Appl. No.: 13/721,517

(22) Filed: Dec. 20, 2012

(65) Prior Publication Data

US 2014/0180972 A1    Jun. 26, 2014

(51) Int. Cl.
 *G06T 19/00*   (2011.01)
 *G06N 99/00*   (2010.01)
 *G06N 5/02*    (2006.01)
(52) U.S. Cl.
 CPC .............. *G06N 99/005* (2013.01); *G06N 5/02* (2013.01)
(58) Field of Classification Search
 CPC .................................................. G06T 19/006
 USPC ......................................................... 345/633
 See application file for complete search history.

(56) References Cited

U.S. PATENT DOCUMENTS

2004/0145594 A1* 7/2004 Kobayashi .............. G06T 15/20
                                              345/633
2005/0093868 A1* 5/2005 Hinckley ................. G06F 3/011
                                              345/502
2006/0224546 A1* 10/2006 Ballin ..................... G06T 17/00
                                              706/62
2009/0167787 A1* 7/2009 Bathiche ................. A63F 13/10
                                              345/633
2009/0271715 A1* 10/2009 Tumuluri ............ G06F 19/3437
                                              715/757
2011/0093463 A1* 4/2011 Oliver ............... G06F 17/30958
                                              707/737
2011/0307841 A1* 12/2011 Boldyrev et al. ............. 715/863
(Continued)

OTHER PUBLICATIONS

International Search Report for International Application No. PCT/FI2013/051066, dated Mar. 24, 2014, 7 pages.
(Continued)

*Primary Examiner* — Jacinta M Crawford
*Assistant Examiner* — Phong Nguyen
(74) *Attorney, Agent, or Firm* — Alston & Bird LLP

(57) ABSTRACT

An approach is provided for behavioral pattern generation for mixed reality objects. A mixed reality platform determines one or more computation closures for describing one or more user behavioral patterns associated with one or more digital objects of at least one augmented reality information space. The mixed reality platform then processes and/or facilitates a processing of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

20 Claims, 12 Drawing Sheets

(56) References Cited

U.S. PATENT DOCUMENTS

| | | | |
|---|---|---|---|
| 2012/0015672 A1* | 1/2012 | Jung | G06T 11/00 455/456.3 |
| 2012/0054635 A1* | 3/2012 | Park | G06F 3/011 715/747 |
| 2012/0072917 A1* | 3/2012 | Boldyrev | G06F 9/5072 718/104 |
| 2012/0212406 A1 | 8/2012 | Osterhout et al. | |
| 2013/0088577 A1* | 4/2013 | Hakkarainen | H04N 5/23293 348/46 |
| 2013/0155105 A1* | 6/2013 | Boldyrev | A63F 13/10 345/633 |
| 2013/0176334 A1* | 7/2013 | Boldyrev | G09G 5/377 345/633 |
| 2013/0178257 A1* | 7/2013 | Langseth | 463/4 |
| 2013/0257906 A1* | 10/2013 | Tang | G06Q 30/0241 345/633 |

OTHER PUBLICATIONS

Written Opinion for International Application No. PCT/FI2013/051066, dated Mar. 24, 2014, 9 pages.

* cited by examiner

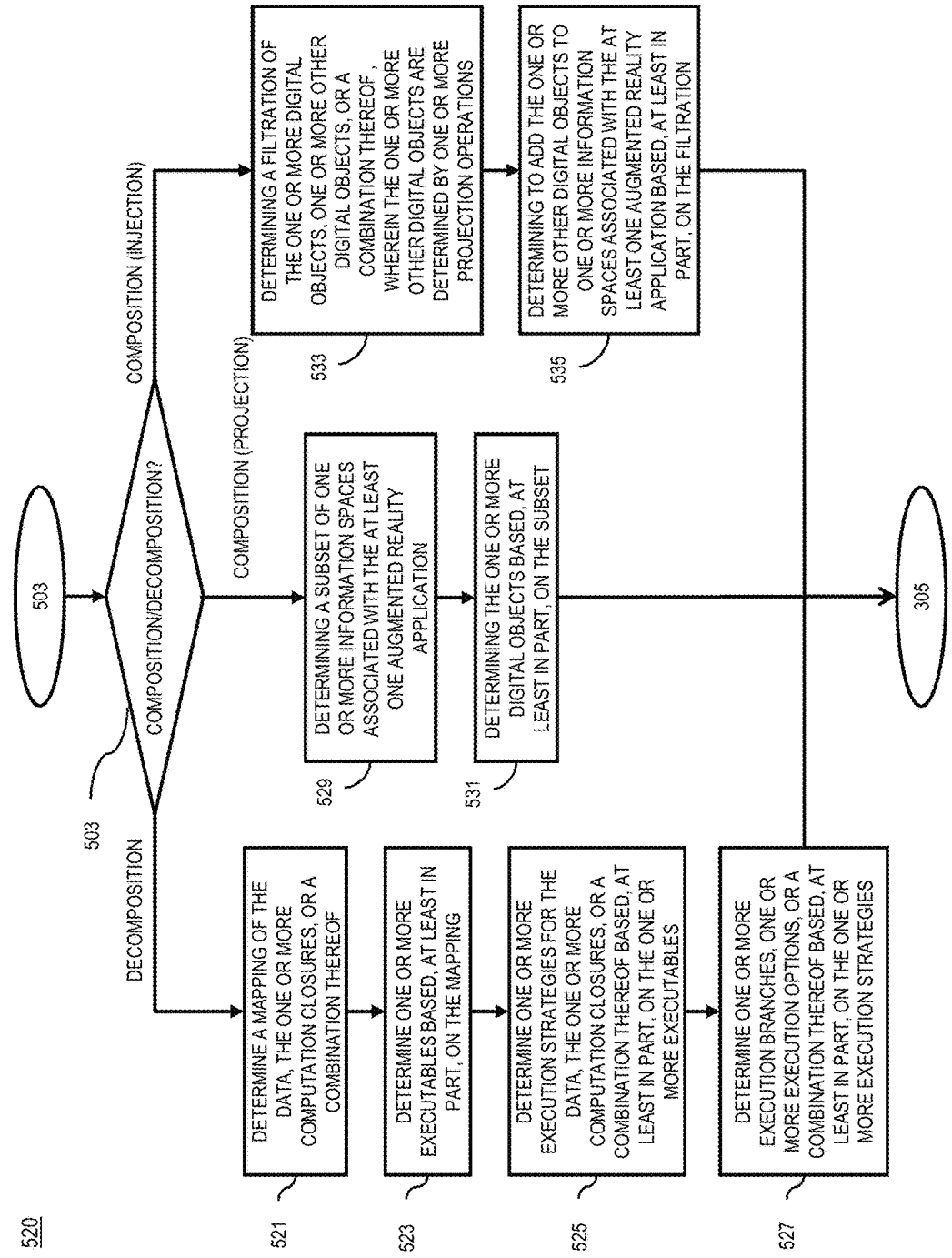

METHOD AND APPARATUS FOR PROVIDING BEHAVIORAL PATTERN GENERATION FOR MIXED REALITY OBJECTS

BACKGROUND

Service providers and device manufacturers (e.g., wireless, cellular, etc.) are continually challenged to deliver value and convenience to consumers by, for example, providing compelling network services. One area of interest has been the development of location-based services (e.g., navigation services, mapping services, augmented reality applications, etc.) that have greatly increased in popularity, functionality, and content. Augmented reality and mixed reality applications allow users to see a view of the physical world merged with virtual objects (e.g., digital objects) in real time. Mapping applications further allow such virtual objects to be annotated to location information. However, with this increase in the available content and functions of these services, service providers and device manufacturers face significant challenges to present the content which is relevant for users and in ways that can be easily and quickly understood by the users. Accordingly, service providers and device manufacturers face significant technical challenges to enabling a personalized user experience that accounts for user behavior within an augmented or mixed reality environment.

Some Example Embodiments

Therefore, there is a need for an approach for providing behavior pattern recognition for mixed reality objects.

According to one embodiment, a method comprises determining one or more computation closures for describing one or more user behavioral patterns associated with one or more digital objects of at least one augmented reality information space. The one or more digital objects aggregate, at least in part, the one or more computation closures, data acted on by the one or more computation closures, one or more results of the one or more computation closures, or a combination thereof. The method also comprises processing and/or facilitating a processing of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more computation closures for describing one or more user behavioral patterns associated with one or more digital objects of at least one augmented reality information space. The one or more digital objects aggregate, at least in part, the one or more computation closures, data acted on by the one or more computation closures, one or more results of the one or more computation closures, or a combination thereof. The apparatus is also caused to process and/or facilitate a processing of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

According to another embodiment, a computer-readable storage medium carries one or more sequences of one or more instructions which, when executed by one or more processors, cause, at least in part, an apparatus to process and/or facilitate a processing of media information associated with at least one augmented reality application to determine one or more computation closures for describing one or more user behavioral patterns associated with one or more digital objects of at least one augmented reality information space. The one or more digital objects aggregate, at least in part, the one or more computation closures, data acted on by the one or more computation closures, one or more results of the one or more computation closures, or a combination thereof. The apparatus is also caused to process and/or facilitate a processing of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

According to another embodiment, an apparatus comprises means for determining one or more computation closures for describing one or more user behavioral patterns associated with one or more digital objects of at least one augmented reality information space. The one or more digital objects aggregate, at least in part, the one or more computation closures, data acted on by the one or more computation closures, one or more results of the one or more computation closures, or a combination thereof. The apparatus also comprises means for processing and/or facilitating a processing of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5B are flowcharts of a process for providing behavior pattern generation for mixed reality objects, according to one embodiment;

DESCRIPTION OF SOME EMBODIMENTS

Examples of a method, apparatus, and computer program for providing behavior pattern generation for mixed reality objects are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
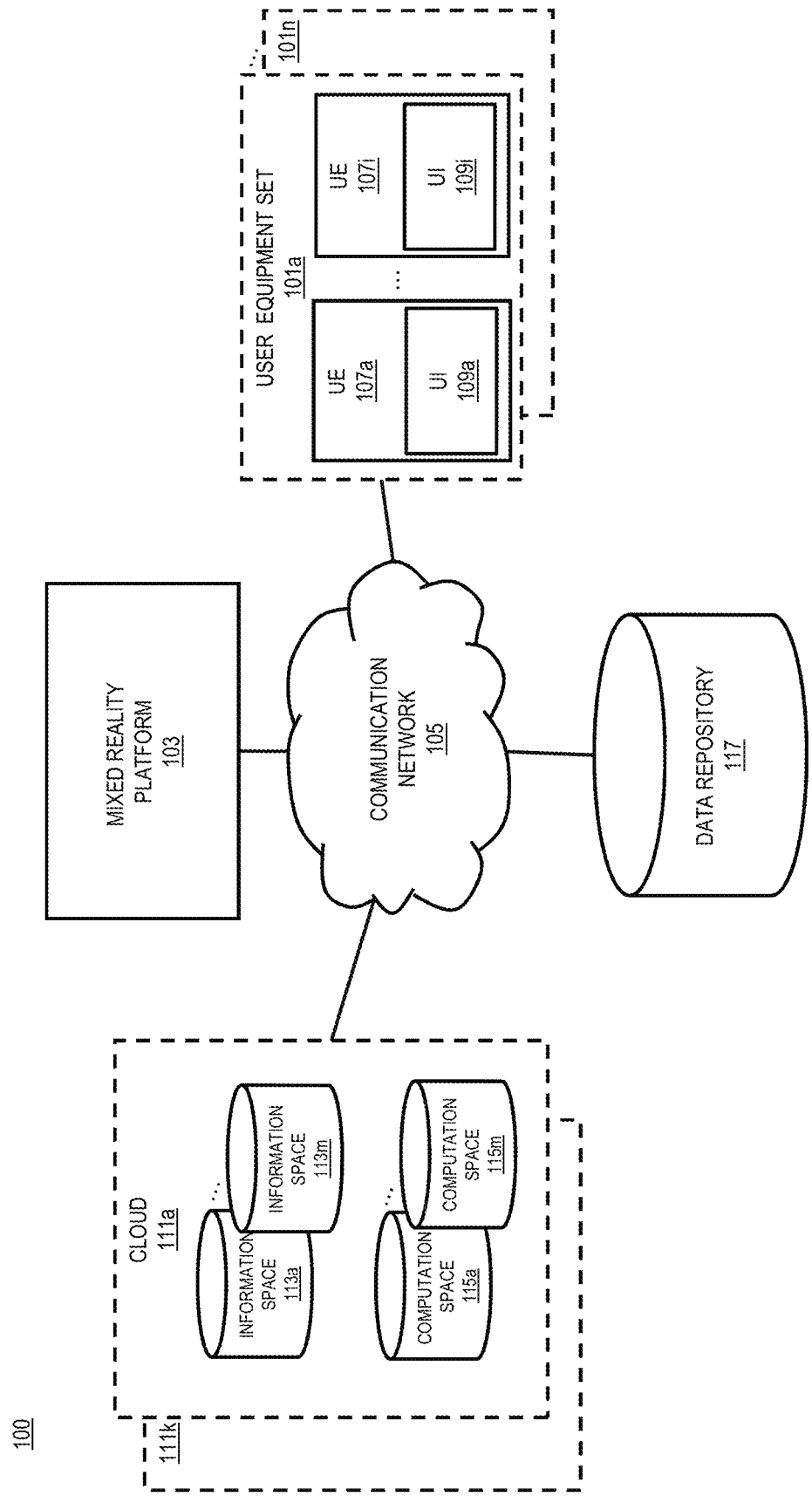
FIG. 1 is a diagram of a system capable of providing behavior pattern generation for mixed reality objects, according to one embodiment.

FIG. 1 is a diagram of a system capable of providing behavior pattern generation for mixed reality objects, according to one embodiment. As noted above, location-based services for mobile devices and computing devices in general are becoming ubiquitous. These services, for instance, can include augmented reality and mixed reality, services and applications. In one embodiment, augmented reality is a special case of mixed reality that enables a user's view of the real world to be overlaid with additional visual information. Mixed reality allows for the merging of real and virtual worlds to produce visualizations and new environments. In mixed reality, physical and digital objects can co-exist and interact in real time. Thus, mixed reality can be a mix of reality, augmented reality, virtual reality, or a combination thereof.

A benefit of using such applications allows for the association of content to a location, or to one or more structures (e.g. buildings, roads, etc.) in the location, wherein the structure in a virtual world may be presented as a three dimensional (3D) object. The content may be shared with others or kept for a user to remind the user of information. Typically, the more precise a structure is defined, the more useful the content.

In one embodiment, a seamless interaction system between a user and mixed reality is built with several subcomponents naturally combined such as, for example, mixed reality scenery, a number of home screens in the mobile or nomadic device, backend support provided by a certain cloud infrastructure and corresponding API extensions, and some other nomadic device with similar capabilities. However, seamless interaction between the user and a mixed reality environment is hard to achieve. For example, reasoning in the real world may be based on various behavioral profiles while the augmented reality concepts may lack access to. In order for a mixed reality system to be capable to reach conclusions and offer solutions based on real facts, artifact detections can be performed to extend the current augmented reality concepts, wherein reasoning engines can be applied so that users and mixed reality systems provide scenes, operations and processes such as what to do or where to go while taking into account behavioral profiles. However, determining such behavioral profiles and/or determining what objects or functions to make available based on the behavioral profiles, particularly on a user-by-user basis, can be technically challenging.

To address this problem, a system 100 of FIG. 1 introduces the capability to provide behavioral pattern generation for mixed reality objects within a mixed reality or augmented reality information/computation space. In one embodiment, the interaction is enabled by the mixed reality platform 103 through creating of decomposable digital objects (artifacts) and use of functional chains available in the user equipment or in one or more computation clouds accessible by the user for behavior pattern generation and/or detection. In other words, in one embodiment, the system 100 provides for both generating behavior pattern from functional elements (e.g., computation closures) of the digital objects and then detecting the behavioral patterns using computation closures aggregated in the digital objects.

In one embodiment, the system 100 determines the behavioral patterns by gathering user interactions associated with the digital objects. In one embodiment, digital interaction data or results are gathered when the objects are tapped, selected, queried for, or otherwise manipulated by a user or users. For example, the system 100 can monitor user interactions when a digital object is dragged in a user interface to a dedicated functional area or to a corresponding place in scenery depicted in a mixed reality view. The dragging of the object, for instance, can be from a mixed reality view of the user interface to a user's home screen or vice versa. In this way, the behavioral patterns are inferred from the functional components of the digital objects and/or from the mixed reality/augmented information space. In addition or alternatively, the behavioral patterns can be specified or created by a user. In one embodiment, the system 100 can then provide service discovery, other computations, etc. associated with the behavioral patterns.

For example, in a mixed reality context, the system 100 enables detection of any artifacts or digital objects within a pointing direction of a user device (e.g., viewable in a mixed reality view). In one embodiment, the digital objects are projected and/or injected between user and mixed reality information spaces based on behavioral pattern generation as discussed with respect to the various embodiments described herein.

In one example use case, a mobile device points to a magazine using a mixed reality application. The system 100 recognizes this pointing interaction as part of a user behavioral pattern and then selects the artifacts or digital objects from the pointing direction (e.g., based on the coverage or scenery viewable in the mixed reality application) that is in line with the user behavioral pattern. For example, the system 100 applies a reasoning engine to detect which digital objects are available for the behavioral pattern or pattern set. In one embodiment, the system 100 may also use an implication analysis to determine when and/or how digital objects or related information are dragged out by the user. If there are multiple user behavioral patterns detected, the system 100 may also analyze which patterns are stronger or weaker (e.g., depending on the degree of matching between the interaction data and the patterns) to select the objects, provide for service functions, etc.

In one embodiment, the system 100 provides a behavioral pattern tool set including, at least in part, pattern generation, detection, fetching, storing, and creation/extraction to defined/selected functions in a mixed/augmented reality information space. In one embodiment, the process of pattern generation is primarily personal to a specific individual. However, in other embodiments, the system 100 may apply the various embodiments of the behavioral pattern tool set to other similar individuals (e.g., based on user characteristic or profile similarity) or to group level behavior pattern generation (e.g., when group granularity is selected or when interactions from multiple users are collected).

In one embodiment, as noted previously, the system 100 ties behavioral patterns to specific interactions with artifacts/digital objects. In one embodiment, the interactions may include the number artifacts/digital objects that are tapped, dragged to a user and/or mixed reality launch pad (see examples below), or matched to the results of a query. For example, the system 100 may include a query input area (e.g., a free form query input area, a one line search area, a URL link to a number of objects, or a combination thereof) as form of interaction with digital objects.

In one embodiment, the system 100 can use the behavioral patterns to recognize when to provide contextually relevant assistance results (e.g., proximity navigation assistance) to users and/or their devices. By way of example, the system 100 merges system event notations from various digital objects (e.g., scheduled events associated with the digital objects) to enable to see and provide rendering assistance results (e.g., navigation assistance results) deliveries to contextually appropriate devices (e.g., consisting of devices for which the assistance has some relevancy based on detected behavioral patterns or other contextual information). In one use case, for instance, the system selects devices and/or their users that have such relevancy (e.g., based on behavioral patterns) to deliver the assistance. For example, in a scenario where a user or device is approaching another device or user, the system 100 may provide assistance in terms of proximity navigation to direct the approach device to the another device.

In one embodiment, the source of the behavioral patterns may be detected from user behavior patterns determined from interactions with digital objects of a mixed reality platform, digital objects presented in in-vehicle navigation systems (e.g., smart dashboards or other in-vehicle navigation systems), and the like. In one embodiment, the system 100 may bind the assistance results in different orders to target rendering devices: (1) to different dashboards (e.g., where the results are borrowed or shared from target and source car dashboards); (2) removable tablets; (3) saved smartphones; etc. In some embodiments, the system 100 provides additional function components for dragging and dropping and using digital objects in such devices when the positions of the devices change (e.g., when traveling or moving during navigation). In cases where the target and source devices because further separated, the system 100 enables users to zoom in and out of a particular location to reroute or provide assistance results to selected digital objects (e.g., a digital object representing a target device in a mixed reality environment).

In one embodiment, for the purpose of decomposition of a digital object (e.g., from an augmented reality information space), a certain virtual area, presented and supported by the user equipment can be utilized, where the digital objects can be parsed in order to map the data and computational parts associated with behavioral pattern generation and delivery of assistance results against the computational ontology used and respective functional elements. Furthermore, the functional elements can be provided by the user equipment or by any other computing devices, for example, one or more neighbor devices over some communication means, a server in the cloud, etc. or a combination thereof.

In one embodiment, the digital objects presented and exposed by the mixed reality platform 103 are constructed from the data and respective processes presented with computation closures of computation spaces, enforced with particular decomposition techniques, while applying relevant privacy adjustments.

As shown in FIG. 1, the system 100 comprises sets 101a-101n (also collectively referred to as sets 101) of user equipment (UEs) 107a-107i (also collectively referred to as UEs 107) having connectivity to the mixed reality platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, close proximity network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.). In one embodiment, the UEs 107 may be devices embedded or installed in vehicles such as car dashboards, removable tablets, personal navigation devices, smartphones, etc.

In one embodiment, the UEs 107a-107i are respectively equipped with one or more user interfaces (UI) 109a-109i (also collectively referred to as UIs 109). Each UI 109a-109i may consist of several UI elements at any time, depending on the service that is being used. By way of example, UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computation closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107 may be a mobile device with embedded Radio Frequency (RF) tag system of device to device connections such that computational operations and content can be locally transmitted among devices, where devices can be peer devices, accessories, mobile readers/writers, or a combination thereof (e.g., via device to device touches). Additionally, the computational operations and content transmissions can be between devices and tags, where content read/write takes place among devices and tags, with minor or no computational operations at tag side. In one embodiment, the computation closures associated creating/detecting behavioral patterns, providing assistance results, etc. may be exchanged from device to device RF tags (e.g., near field communication (NFC) tags).

In one embodiment, the process of interaction between a user of UE 107a-107i and mixed reality may consist of several stages of operations such as, for example, bootstrapping, usage, end titles, etc. In one embodiment, the bootstrapping operation may include augmenting a scene (e.g. a video stream, an audio stream, one or more still images, etc.) with anchors, wherein anchors are empty artifacts or digital objects. The bootstrapping operation may also include definition of digital objects and attaching them to the selected anchors. The user may define a certain number of digital objects in an augmented reality view with associated data and computations.

In one embodiment, during the usage operation a user of UE 107a-107i is enabled by the mixed reality platform 103 to select and drag digital objects in order to undertake certain actions. For example, a user interested in museum tours, may select a certain museum, select a route to the museum, select points of interest associated with the museum, check the schedules associated to the points of interest and check whether the schedules are based on invitation or for the public. The user may be also given the capability to update existing digital objects by injecting a new or updated digital object into a data repository 117 or other storage areas managed by the mixed reality platform 103.

In one embodiment, a user is enabled to define a subset of digital objects with restricted view (number of properties). It is noted that, a restricted area may have no digital objects or may not be justified according to the user's personal settings.

In one embodiment, results from/to digital objects that are dragged between user and mixed reality are gathered. Such digital objects consist of data and computations. Interaction results are gathered when object is dragged to a dedicated area, or to the right place of a scenery (e.g. from mixed reality to home screens or vice versa). Digital objects gather results from initial computations at home screen and updated objects are dragged back to mixed reality. This provides interactions, computations and service discovery. Additionally, one or more digital objects may be enabled in mixed reality after an RF tag has been touched in real world.

In one embodiment, a user can control the details that are pushed to the provider (shown in the mixed reality). The style and outlook of these realities can be different, for example sliced, with or without borders, increased and decreased outlooks, etc.

In one embodiment, the digital objects are generated by the mixed reality platform 103 via basic projection and injection functionalities. In order to project from one or more information spaces 113a-113m (also collectively referred to as information spaces 113), one or more computation spaces 115a-115m (also collectively referred to as computation spaces 115), or a combination thereof, a partitioning function can be used. Similarly, in order to return the contents of a projected information space or computation space back into the space, the projected space is injected back under a filter. The filter removes any inserted information or computation that is not to be injected. The injection also induces a merge of information over any projected spaces, where multiple spaces exist.

In one embodiment, seamless interaction between the user and mixed reality is used for rich media content processes, and for determination what users require from mixed reality scenes and communications.

In one embodiment, projection and injection of the user and mixed reality forms behavioral patterns and operations between the realities. In case of projection, a triggering event, for example provided by a query, is received for projecting computation closures from an augmented reality computation space 115a-115m, representing a digital object. As previously described, in one embodiment, the computation closures associated with creating/detecting behavioral patterns and for providing assistance results based on those behavioral patterns are serialized or otherwise encapsulate in the digital objects.

In one embodiment, a subset of information content from the augmented reality information space 113a-113m associated with a digital object is extracted by using a partitioning function. Furthermore, a run-time information space is created in cloud 111a-111n using the extracted subset of information content.

In one embodiment, an injection operation includes receiving a triggering event, for example a query, to inject computation closures into an augmented reality computation space 115a-115m. Prior to the injection, it is determined whether the computation closure and the augmented reality computation space exist. Furthermore, if the closure and the augmented reality information/computation spaces exist, it is determined whether the computation closure is on a list of information/computation spaces projected from the augmented reality information/computation space.

In another embodiment, if the computation closure is on the list of information/computation spaces projected from the augmented reality information/computation space, a filtering function is applied on the information content of the computation closure and any other information spaces projected from the augmented reality information space. Additionally, the filtered information content is added to the information content of the augmented reality information/computation space.

In one embodiment, any artifacts within the pointing direction of an input equipment (e.g., camera, camcorder, microphone, etc.) are selected to detect any digital objects that are projected and or injected between user and mixed realities. For example, when a mobile device points to a magazine including information such as brand name, certain text, picture etc., it picks up various artifacts from the pointing direction (coverage, scenery). The mixed reality platform 103 can detect which digital objects are available. It is also able to make implication analysis of when and how objects information is dragged out. In one embodiment, the mixed reality platform 103 can determine what objects to make available based on behavioral patterns created/detected by one or more computation closures of the objects. For example, the available objects may be selected from among objects associated with a particular behavioral pattern set. In one embodiment, the implication analysis may consist of determining the relative strengths (e.g., which are stronger or weaker) of multiple behavioral patterns that may be exhibited by a user or group of users.

In one embodiment, the mixed reality platform 103 can process the behavioral patterns determined from user interaction with the objects (or from patterns specified by a user) to determine whether provide assistance results from at least one device to another. As previously noted, this assistance can be for close proximity navigation among multiple devices.

In one embodiment, the projection and injection of information and/or computations between a user and mixed reality behavioral patterns, and operations between these realities is formed in multiple stages. In one embodiment, a composition of behavioral patterns is added to the identity of the user and the mixed reality architecture. In one embodiment, the behavioral patterns are determined based, at least in part, on one or more interactions with the mixed reality environment and/or the digital objects within the environment.

In one embodiment, one or more functional elements for the event/object are set, wherein the object is read as data, the process that is going to be applied on the data is determined and the functional element is formed based on the data and the determined process. For example, computation closures from computation spaces 115a-115m can be utilized as fine grain processing mechanisms to describe projection and injection. It is noted that projection and injection are baseline functions of the information spaces 113a-113m and the computation spaces 115a-115m.

In one embodiment, the mixed reality platform 103 may cover any item (e.g., digital object) that can be created and updated for a user of UE 107a-107i and for the mixed reality platform 103. The digital objects can be utilized by barcode readers, text recognition readers, RF memory tag readers/writers containing readable/writable digital objects, etc. For example, while viewing a magazine, the name of the magazine can provide suitable item characteristics. A user of UE 107a-107i may point the UE to the magazine's brand name, certain text, picture, etc. and picks up various artifacts from the pointing direction (coverage, scenery, etc.). With reasoning applied, the mixed reality platform 103 it is able to detect what digital objects are available, in the data repository 117 or within the mixed reality platform 103 or a combination thereof, for the magazine's reality. Furthermore, the mixed reality platform 103 can detect implications associated with the digital objects, wherein the implications are activated when object(s) information is dragged out. Additionally, the mixed reality platform 103 may recognize other data associated with the digital objects, for example, data other than the bar codes.

In one embodiment, the mixed reality platform 103 can be associated with a cognitive radio system (not shown). The cognitive radio connectivity can enable transmission of context information, locations, and recognized objects in a particular event, other object and their neighborhoods. The cognitive connectivity can also transmit behavioral patterns affecting a user of UE 107a-107i, mixed reality projection and injection, functional elements attached to particular places, spaces, times, users, scenes, etc.

In one embodiment, data such as time, event, place, space, users, scenes, etc. associated with a specific user's personal information is taken from the user's spaces (e.g., information spaces 113 and/or computation spaces 115) such as for example user's calendar events, wherein the user can control the limited data profile available from the context specific databases. Furthermore, the selected augmented data is responded back. The user's own agent can do reasoning on selected data and provide collected entity combining the data and the reasoning with controlling functionality, to release only the minimum information needed for a process. In other words, a user of UE 107a-107i knows and controls his/her own data. It is noted that typically in augmented reality systems a high volume of data resides elsewhere and is beyond user's own control. However, the mixed reality platform 103 allows projection of data to the user's own space. A user's own data settings can be much bigger than what is relieved to the system when a digital object is dragged between the user and the mixed realities display on the UI 109a-109i. Furthermore, the information attached to the dragged object is updated to/from a launch pad area of the UI or to another particular area.

In various embodiments, the style, outlook and appearance of the user and mixed reality displays may be different based on operations done with projection and injection activities such as, for example, sliced equally (or ⅓, picture in picture), with outlook borders, increased and decreased outlooks depending on the projection or injection functionalities, etc. Therefore, the outlook and style can adapt to the focus point selected by the user.

Furthermore, projection and injection may include transmission of mixed reality identifies and delivering preliminary metadata associated with the object, if the metadata exist, to/from a launch pad, pulling selected area or object to the launch pad (from mixed reality screen to user reality home screen launch pads, or vice versa), selecting or turning the object direction, where to drag (from mixed reality display to user reality home screen or vice versa) if necessary, or a combination thereof. Additionally, a user may have the ability to tap other objects, move all tapped object to the launch pad, and tap the launch pad area, to retrieve context menu or a drop down list.

In various embodiments, the user and mixed reality display may consist of one or more launch pads.

As previously noted, in one embodiment, the behavioral pattern may be tied to a number of items tapped, dragged through launch pad, or only those that match the results of a query. The mixed reality platform 103 may provide free form of input query area, one line search query area, URL links to number of objects, or a combination thereof to the user of UE 107a-107i.

In one embodiment, several subcomponents such as mixed reality scenery, a number of home screens in the mobile or nomadic device, backend support provided by a certain cloud 111a-111n infrastructure and corresponding Application Programming Interface (API) extensions, some other nomadic device with similar capabilities, etc. are naturally combined, for instance, to provide the functions and/or user interfaces of the various embodiments described herein.

In one embodiment, an operational mode of the mixed reality platform 103 consists of observing augmented reality stream with digital objects or anchors. The augmented reality window can be adjusted in either two or more views tiled along the sides of each other, where at least one should represent a home screen with application launch pad.

In one embodiment, the launch pad (e.g., associated with the UE 109) enables dragging of the digital object from augmented reality side or other screens. Once a digital object is within a launch pad area, the process of digital object decomposition takes place. A launch pad can work as a primary parser, execution strategy enabler and process mapper along with data.

In various embodiments, operations are bi-directional, wherein the functional properties along with relevant data can be gathered from one or more home screens and either a certain digital object can be associated or new digital objects can be created.

In one embodiment, digital objects can be placed back to the augmented reality side (screens) wherein the object can update already existing augmented or digital objects or can be placed in newly defined and activated anchors.

In one embodiment, a home screen can hold several applications (functional chains constructed out of the computation closures and connected into branches).

In one embodiment, once a digital object is dragged from augmented reality screen to home screen the following may occur:

$$A\{Adata, Acomp\} \rightarrow decompose\{A\} \rightarrow \{Adata, Acomp, Map[Adata], Map[Acomp], ExecStrategy, Branches, Options\} \qquad (1)$$

wherein A is a digital object compose of data, Adata and computation closures Acomp. The digital object A is then decomposed into Adata, Acomp (Adata and Acomp are allocated according to a particular runtime environment), Map[Adata] and Map[Acomp] are parsed with process mapper in order to determine certain executables to be executed against the Adata. The ExecStrategy is constructed and updated with a mapping of execution results. The Branches and Options represent number of branches and number of options and are taken into the functional chains selection process before actual execution starts.

In one embodiment, once the functional elements are gathered on a home screen, the process of migration and projection takes place, as a reverse of the decomposition process (1). Furthermore, the size and the position of augmented reality screen can be adjustable as seen in exemplary embodiments of FIGS. 6A-6C.

By way of example, the UEs 107a-107i, and the mixed reality platform communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
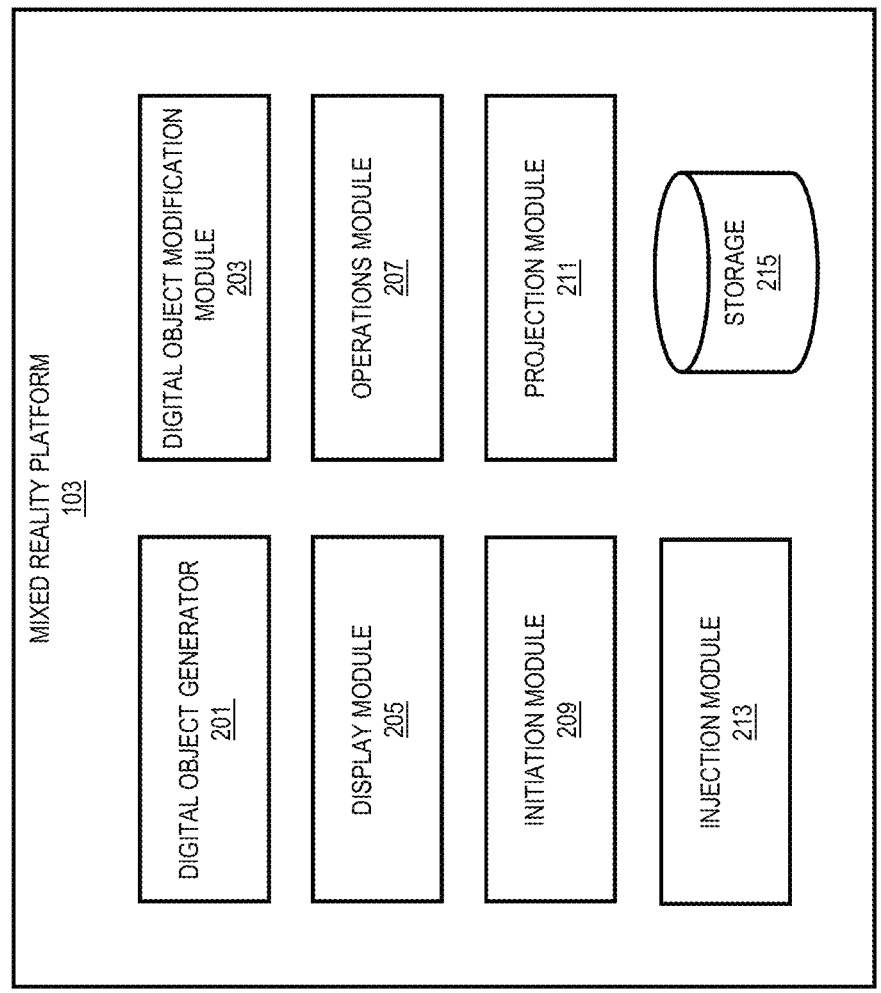
FIG. 2 is a diagram of the components of an mixed reality platform, according to one embodiment.

FIG. 2 is a diagram of the components of the mixed reality platform, according to one embodiment. By way of example, the mixed reality platform 103 includes one or more components for providing seamless interaction in mixed reality. It is contemplated that the functions of these components may be combined in one or more components or performed by other components of equivalent functionality. In this embodiment, the mixed reality platform includes a digital object generator 201, a digital object modification module 203, a display module 205, an operations module 207, an initiation module 209, a projection module 211, an injection module 213, and storage 215. In one embodiment, the components of FIG. 2 execute one or more algorithms for providing behavioral pattern generation and assistance results for mixed reality objects. Example functions of these components are described with respect to the flowcharts of FIGS. 3-5B below.

Figure 3:
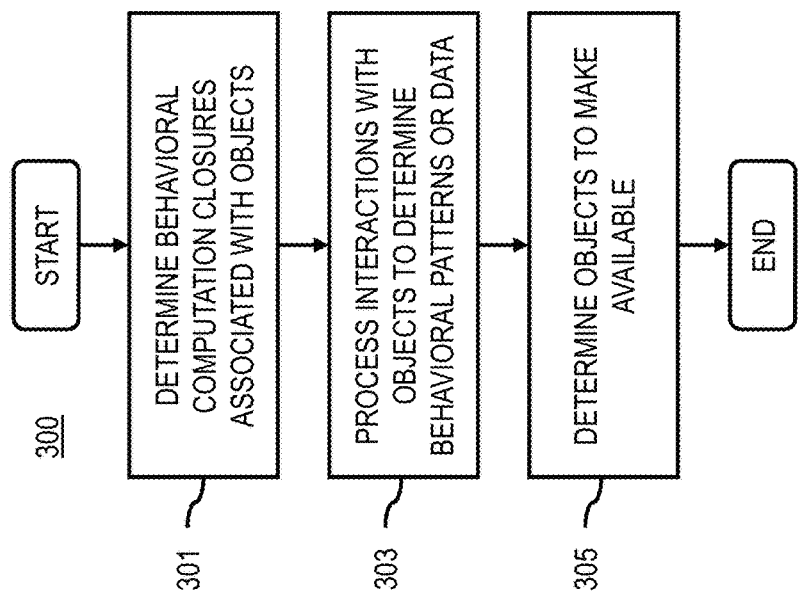
FIG. 3 is flowchart of a process for providing behavior pattern generation for mixed reality objects, according to one embodiment.
Figure 8:
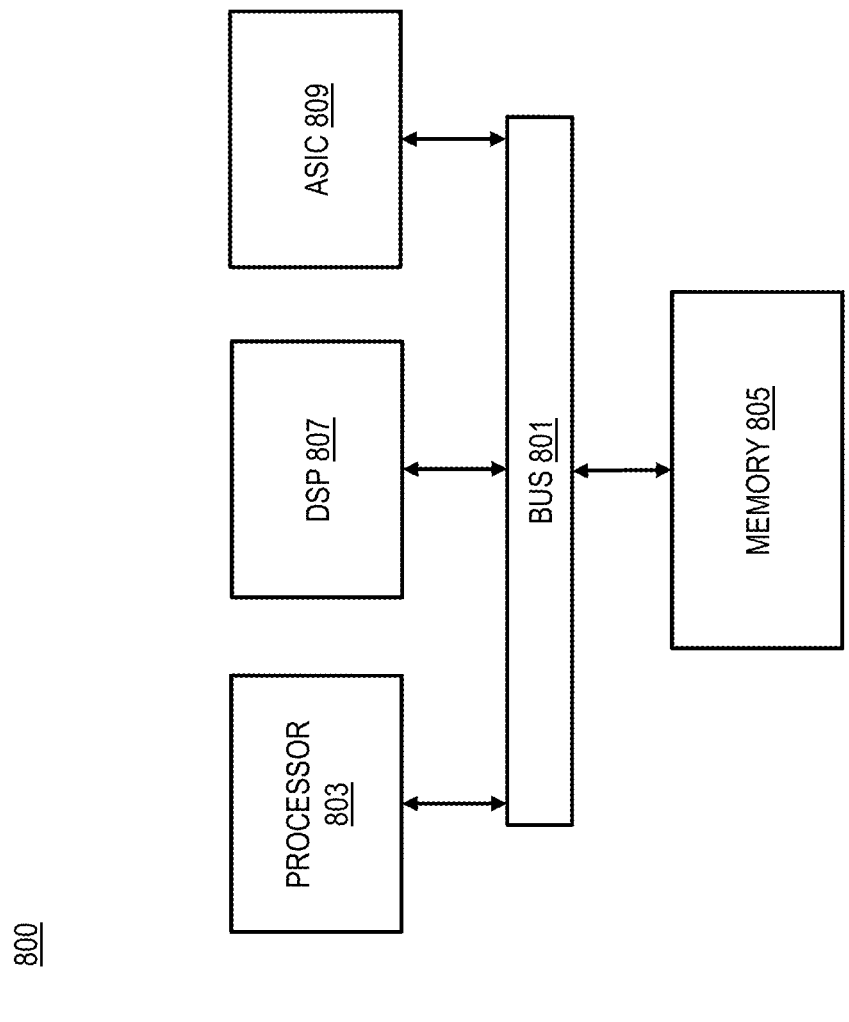
FIG. 8 is a diagram of a chip set that can be used to implement an embodiment of the invention.

FIG. 3 is a flowchart of a process for providing behavior pattern generation for mixed reality objects, according to one embodiment. In one embodiment, the mixed reality platform performs process 300 and is implemented in, for instance, a chip set including a processing and a memory as shown in FIG. 8.

In step 301, the mixed reality platform 103 determines one or more computation closures for describing one or more user behavioral patterns associated with one or more digital objects of at least one augmented reality information space, wherein the one or more digital objects aggregate, at least in part, the one or more computation closures, data acted on by the one or more computation closures, one or more results of the one or more computation closures, or a combination thereof.

More specifically, the process for determining the one or more computation closures associated with behavioral patterns include, for instance, a creation and an extraction stage of the determining user and mixed reality behavioral patterns. Accordingly, the mixed reality platform 103 performs, for instance, a sequence of operations related to creation of digital objects capable of behavioral pattern generation.

In one embodiment, the digital object generator 201 receives or otherwise determines a triggering event to project a computation closure from an augmented reality information space 115 to represent at least one digital object (e.g., an artifact). In one embodiment, the triggering event can be a query for the digital object or artifact. For example, if a UE 107 is presenting an augmented reality application, the query can be triggered when the user points a camera of the UE 107 to a particular view, and requests that the mixed reality platform 103 present objects visible in the view. The query, for instance, may designate the physical location visible in the augmented or mixed reality view and then use the location information and viewpoint information to query for the appropriate objects or artifacts that may be anchored to the locations visible in the view.

In response to the triggering event, the digital object generator 201 interacts with the projection module 211 to extract a subset of information content from the augmented reality information space 115 containing the desired digital object or artifact. In one embodiment, the projection module 211 uses a partitioning function on the augmented reality information space 115 to extract or otherwise project the digital object.

Next, in one embodiment, the projection module 211 interacts with the operations module 207 to cause, at least in part, a creation of at least one run-time information space based, at least in part, on the one or more digital objects or the extracted subset of information content representing the digital objects. The operations module 207 also, for instance, entails the run-time information space objects with descriptions of the computations used for behavioral pattern decomposition. In one embodiment, these computations represent the computations and related data for recognizing user interaction with the objects and then compiling user behavioral patterns from these interactions. For example, the operations module 207 can cause, at least in part, an entailing of the one or more user behavioral patterns, description information associated with the one or more user behavioral patterns, or a combination thereof with the one or more digital objects in the at least one run-time information space.

Following the entailing of the computations or the description of the computations, the digital object generator 201 can ground non-wrapped computational sequences entailed in the digital objects with terminations (e.g., NIL terminations, null terminations, etc.). The digital object generator 201 then interacts with the injection module 213 to serialize and store the resulting computational sequences. For example, the injection module 213 can inject the serialized computational sequences in the augmented reality information space 115 for subsequent use. In one embodiment, the serialization and storage of the digital objects entailed with the computations for behavioral pattern composition completes with creation process.

With respect to the extraction stage or process, the mixed reality platform 103 uses the digital objects with the entailed computations for behavioral pattern decomposition. For example, In step 303, the mixed reality platform 103 processes and/or facilitates a processing of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

More specifically, in one embodiment, the digital object generator 201 of the mixed reality platform 103 receive or otherwise determines a triggering event (e.g., a query as described above) to inject a computation closure associated with behavioral pattern decomposition into an augmented reality information space 115. In response to the triggering event, the digital object generator 201 interacts with the injection module 213 to determine whether the requested computation closure and the augmented reality information space exist. In one embodiment, if the computation closure (e.g., associated with a digital object or artifact of interest) does not exist, the digital object generator 201 can initiate the computation closure creation process described above.

In one embodiment, if the computation closure exists, the injection module 213 can determine whether the requested computation closure is on a list of information spaces projected from the augmented reality space 115. If the computation is on the list, the injection module 213 applies, for instance, a filtering function on information content of the requested computation closure and any other information spaces projected from the augmented reality information space. The injection module 213 then adds the filtered information content to the information content of the augmented reality information space 115.

The injection module 213 can then interact with the operations module 207 to read the serialized and stored computational sequences associated with the computation closures from the storage. In one embodiment, the operations module 207 causes, at least in part, a traversal of the one or more computation closures to detect the one or more user behavioral patterns. For example, the user behavioral patterns can be detected from one or more user interactions with the associated digital objects in an augmented or mixed reality environment. The operations module 207 then causes, at least in part, an extraction of the data, the one or more computations, or a combination thereof associated with the detected one or more user behavioral patterns from the augmented reality information space 115. As previously noted, the composition of the behavioral patterns detected in the above processes is added to the identity of the user and the mixed reality architecture.

In one embodiment, the mixed reality platform 103 determines one or more characteristics of one or more items in at least one view of one or more augmented reality applications associated with the at least one augmented reality information space, and then determines the one or more digital objects to make available based, at least in part, on the one or more characteristics, the one or more user behavioral patterns, or a combination thereof (step 305). In one embodiment, the behavioral patterns are based on one or more interactions with the items including, at least in part, a number of times the one or more items are tapped, dragged, viewed, focused upon, queried, or a combination thereof.

For example, in one use case, if a user focuses an augmented or mixed reality view on the name of a magazine, the name can provide suitable item characteristics that are in line with valid behavioral pattern creation and extraction stages. More specifically, a UE 107 points to the magazine (e.g., <brand name, certain text, picture, etc.>) and/or picks up those selected artifacts or digital objects from the pointing direction of the UE 107 (e.g., coverage, scenery) that is in line with a user's behavioral patterns. When applying a reasoning engine, the mixed reality platform 103 is able to detect which digital objects are available for the user's or mixed reality behavioral pattern set. In one embodiment, the mixed reality platform 103 is also able to recognize what other behavioral patterns or users are associated with the particular behavioral data recognized in associated with the digital object of interest.

As part of this process, the mixed reality platform 103 sets the functional element of the digital objects by, for instance, reading the functional element as data and determining what should be done with the processing components and/or the data components of the objects. In other words, computational closures are taken to be utilized as fine grain processing mechanisms to describe behavioral patterns in more detail (e.g., to support the computation closure mechanism).

In one embodiment, the mixed reality platform 103 enables creation, extraction, and/or selection of digital objects and/or related behavioral pattern computations by taking the object or function element to a launch pad area of a user interface (e.g., see description of user interfaces with respect to FIGS. 6A-6D below) for reasoning over user and mixed reality behavioral patterns and associated digital compositions.

In one embodiment, the mixed reality platform 103 enables creation and extraction processes to form behind the launch pad area. For example, the launch pad provides backend support, and exposes cloud processes to the functional elements if needed. In this way, the mixed reality platform 103 is able to create and update digital objects that support user and mixed reality systems behavioral patterns. As described above, the creation and extraction stages (e.g., of behavioral patterns and/or the computations supporting behavioral pattern detection) rely on computation closures and the functional chain flows arising from the computation closures.

In summary, the mixed reality platform 103 provides creation and extraction mechanisms related to generating behavioral patterns for mixed reality objects. For example, the mechanisms consists of actions such as: (1) select the focus point from user or mixed reality valid behavioral patterns or user-created patterns; (2) enable tapping or otherwise interacting with digital objects which are in line with supported behavioral patterns (and exclude those objects that are outside valid behavioral patterns; (3) drag, move, or locate the objects compatible with the behavioral patterns to the launch pad; (4) identify objects that are associated with particular behavioral patterns, and verify the objects against user supported patterns; (5) determine behavioral patterns at different levels of granularities from individual-specific behavioral patterns to group-specific behavioral patterns; and the like.

Figure 4:
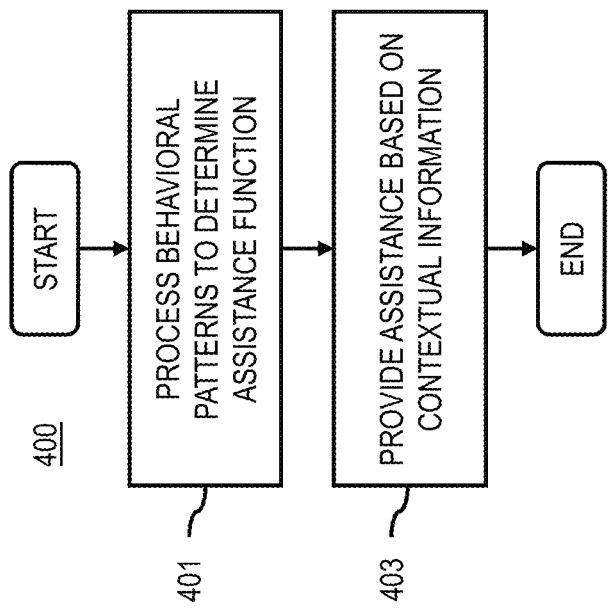
FIG. 4 is a flowchart of a process for determining an assistance function between a source device and a target device based on behavioral patterns, according to one embodiment.

FIG. 4 is a flowchart of a process for determining an assistance function between a source device and a target device based on behavioral patterns, according to one embodiment. In one embodiment, the mixed reality platform 103 performs process 400 and is implemented in, for instance, a chip set including a processing and a memory as shown in FIG. 8. In one embodiment, the process 400 is based on the creation and/or extraction of the behavioral patterns and/or computations associated with the behavioral patterns described with respect to the process 300 of FIG. 3.

In step 401, the mixed reality platform 103 processes and/or facilitates a processing of the one or more user behavioral patterns to determine at least one assistance function with respect to the one or more digital objects between at least one device (e.g., a source device) and at least one other device (e.g., a target device). In other words, the mixed reality platform 103 provides for behavioral pattern recognition to support rendering or providing assistance from one UE 107*a* to another UE 107*b*. In one embodiment, whether one device provides assistance results (e.g., associated with one or more digital objects of an augmented reality environment) can be a function of behavioral patterns associated with the UEs 107a-107b and/or their users. In one embodiment, assistance results can provided in terms of proximity navigation from functional elements (e.g., associated with digital objects) or the user's own initiation. By way of example, the participating devices (e.g., the UEs 107a-107b) include, at least in part, one or more dashboard devices, one or more in-vehicle navigation devices, one or more mobile devices, or a combination thereof.

In one embodiment, the process for providing assistance results includes an interrogation stage and an extraction stage. For example, during the interrogation stage, the digital object generator 201 of the mixed reality platform 103 receives or otherwise determines a behavioral pattern or other relevancy factor (e.g., contextual relevance such as location, time, activity, etc.) as a triggering event (e.g., provided by a query to render assistance) to project a computation closure from an augmented reality information space wherein the computation closure represents a digital object or artifact. In one embodiment, the mixed reality platform 103 determines spatial relationship information (e.g., orientation, distance, etc.) between the at least one device and the at least one other device, and then determines the at least one assistance function, a presentation of the one or more digital objects, or a combination thereof based, at least in part, on the spatial relationship.

In one embodiment, the projection module 211 uses a partitioning function to bind a subset of relevancy information content, and to merge other triggering events from other augmented information space digital objects. By way of example, triggering events or behavioral patterns can include one UE 107a approaching another UE 107b. For example, as a user of the UE 107a is approaching the user's car which includes an embedded UE 107b (e.g., a smart dashboard), one or more digital objects associated with or representing the UE 107b may provide proximity navigation assistance to the UE 107a to help the user locate the car in a parking lot. In this way, the mixed reality platform 103 is able to communicate, find and merge, bind, drag and drop, zoom in and track the path based on a level of relevancy to the distance between the source and target devices. In one embodiment, the level of relevancy can be further based on a level of trustworthiness between the source and target devices.

After the binding process, the operations module 207 can create a run-time rendering assistance information space 115 using the extracted subset of the information content partitioned above or determined from the digital object associated with the triggering event. The operations module 207 then entails the run-time dragging and dropping functionality for using digital objects within the run-time rendering assistance information space 115 or other related information space with the description of the computations for rendering assistance based on behavioral and/or relevancy information. In one embodiment, the computations are associated with: (1) determining when the positions of the devices change; (2) determining how to render the assistance results in the augmented reality view, including determining the zoom or field of view based a device's location or assistance characteristics; (3) rerouting objects with known (or unknown) relevancy and behavioral pattern; etc.

In one embodiment, the mixed reality platform 103 enables users to see rendering assistance deliveries (e.g., between source and target devices) and/or limit the rendering assistance to provide (e.g., based on security or privacy policies). In addition, rendering devices may set some triggering parameters. In one embodiment, the triggering parameters may be shared with other rendering devices or released from other proximity information spaces (e.g., local databases, wireless memories, cognitive radio connectivity databases, etc.). By way of example, the deliveries, limits, triggering parameters, and related information or computations may be entailed with the digital objects or assistance results.

As with the creation stage of process 300, in one embodiment, the projection module 207 can ground non-wrapped computational sequences (e.g., associated with rendering assistance) with terminations (e.g., NIL terminations, null terminations, etc.). The projection module 207 then serializes and stores the computational sequences for rendering assistance in terms of proximity navigation.

The extraction stage of providing rendering assistance is similar to the extraction process described above with respect to process 300. For example, the digital object generator 201 of the mixed reality platform 103 receives or otherwise determines a selection of triggering events (e.g., results for rendering query) to inject one or more computation closures associated with rendering assistance results into an augmented reality information space 115 between source and target devices.

The injection module 213 then determines whether the requested computation closures and the augmented reality information space 115 exist. If the computation closures and/or augmented reality information space 115 do not exist, the injection module 213 can build them for the requested session (e.g., a close proximity navigation session using assistance results). If the computation closures and/or augmented reality information space 115 exist, the injection module 213 can determine whether the requested computation closure (e.g., computation closure associated with providing rendering assistance from one device to another) is on a list of trusted information spaces to assist in deciding whether use the requested computation closures.

In step 403, the mixed reality platform 103 determines the at least one assistance function based, at least in part, on contextual information associated with the at least one device, the at least one other device, or a combination thereof. In one embodiment, the at least one assistance function includes, at least in part, proximity navigation information associated the one or more digital objects, the at least one device, the at least one other device, or a combination thereof. For example, the injection module 213 can determine the distance projected from a certain marked point in the augmented reality information space (e.g., distance between car 1 and car 2 points). In one embodiment, the trustworthiness between the two devices decreases when relative distance increases (e.g., when the other device or user is going further away).

In one embodiment, the injection module 213 applies a filtering function on information content of the requested computation closure and any other information spaces projected from the augmented reality information space 115. By way of example, the filtering function determines relevancy actions or functions to execute based, at least in part, on contextual information of the source and target devices such as distance and speed. In one embodiment, the rendering assistance relevancy action is greater for close proximity between the source and target devices, and provides fewer actions when the source and target devices are further away. In one embodiment, temporal distance (e.g., distance in time) can also be taken into account to determine relevancy actions. In one embodiment, the relevancy actions result in rendering assistance to avoid traffic jams, hands-on rerouting, traffic rerouting with near real time data processing, and the like.

In one embodiment, the injection module 213 optionally reads serialized and stored rendering assistance computation sequences from storage. In this way, the injection module 213 can traverse the sequence of the computational chain to determine certain relevancy and/or behavioral patterns to provide assistance results. In one embodiment, the injection module 213 can extract and release the data and computations for rendering assistance results that are associated with the detected behavioral patterns for close proximity navigation. For example, the mixed reality platform 103 can share assistance results, data, or computations in social networks, when other devices/users are in same situation or context, or restrict usage of the assistance results.

In summary, various embodiments of the mixed reality platform 103 enables source and target devices (e.g., UEs 107) to see and provide rendering assistance results based on contextual relevance and/or behavioral patterns. In one embodiment, the means to determine relevance include pre-registration, information in a database, and/or contextual learning. In case of learning and self-deduction, the mixed reality platform 103 presupposes certain learning capabilities from, for instance, reference data, behavioral data, social data, personal data, etc. In one embodiment, the mixed reality platform 103 can also be applied for car-to-car connectivity establishment via an application showing the other nearby cars on a map, selecting one, and transferring information via cellular connectivity on how to start local connectivity.

Figure 5A:
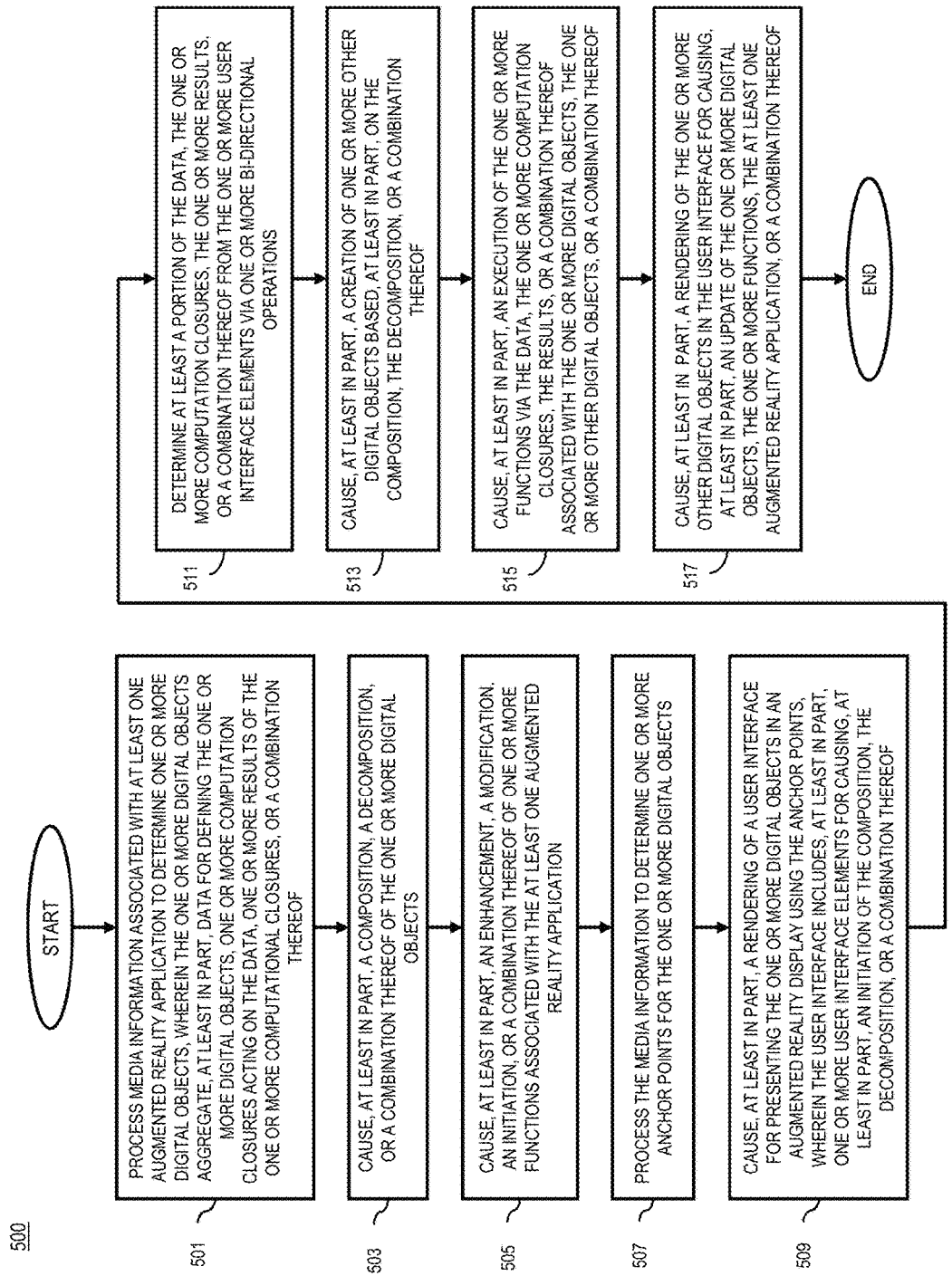

FIGS. 5A and 5B are flowcharts of a process for providing seamless interaction in mixed reality, according to one embodiment. In one embodiment, the mixed reality platform 103 performs the processes 500, 520 or a combination thereof and is implemented in, for instance, a chip set including a processor and a memory as shown in FIG. 8. The processes of FIGS. 5A and 5B provide a general overview for interacting with digital objects in a mixed reality environment.

In one embodiment, per step 501 of flowchart 500 of FIG. 5A, the digital object generator 201 processes and/or facilitates a processing of media information associated with at least one augmented reality application of UE 107a-107i to determine one or more digital objects, wherein the one or more digital objects aggregate, at least in part, data for defining the one or more digital objects, one or more computation closures acting on the data, one or more results of the one or more computation closures, or a combination thereof. The data may be determined from the information space 113a-113m, from the data repository 117, from the storage 215, or a combination thereof. Similarly, the computation closures may be determined from the computation spaces 115a-115m, from the data repository 117, from the storage 215, or a combination thereof. Furthermore, the digital objects, the data, the one or more computation closures, the one or more results or a combination thereof may be stored in data repository 117, in storage 215 or a combination thereof.

In one embodiment, per step 503 of FIG. 5A, the digital object modification module 203 causes, at least in part, a composition, a decomposition, or a combination thereof of the one or more digital objects. The digital object modification module 203, per step 505 of FIG. 5A causes, at least in part, an enhancement, a modification, an initiation, or a combination thereof of one or more functions associated with the at least one augmented reality application of the UE 107a-107i.

In various embodiments, as seen in flowchart 520 of FIG. 5B, the composition, the decomposition or a combination thereof of the one or more digital objects may comprise application of various functions on the digital objects.

In one embodiment, per step 521 of FIG. 5B, the initiation module 209 determines a mapping of the data, the one or more computation closures, or a combination thereof. The mapping can represent the mapping that can identify relationships between the data items (e.g., between real world data and augmented reality data), between the computation closures and data (e.g., identifying the functions that are being applied on the data), or a combination thereof. The mapping results may be stored in the data repository 117, in the storage 215, or a combination thereof.

In one embodiment, per step 523 of FIG. 5B, the initiation module 209 determines one or more executables based, at least in part, on the mapping. The executables are associated with the functions determined by the mapping. The executables may be stored in the data repository 117, in the storage 215, or a combination thereof.

In one embodiment, per step 525 of FIG. 5B, the initiation module 209 determines one or more execution strategies for the data, the one or more computation closures, or a combination thereof based, at least in part, on the one or more executables. The execution strategies may be determined by the application providers, by the user of UE 107a-107i, by the network management entities managing communication network 105 or a combination thereof. The execution strategies may be retrieved from the data repository 117, from the storage 215, or a combination thereof. Similarly, the determined execution strategies may be stored in the data repository 117, in the storage 215 or a combination thereof.

In one embodiment, per step 527 of FIG. 5B, the initiation module 209 determines one or more execution branches, one or more execution options, or a combination thereof based, at least in part, on the one or more execution strategies. The execution branches, execution options, or a combination may be determined by the application providers, by the user of UE 107a-107i, by the network management entities managing communication network 105 or a combination thereof. The execution branches, execution options, or a combination may be retrieved from the data repository 117, from the storage 215, or a combination thereof. Similarly, the determined execution branches, execution options, or a combination may be stored in the data repository 117, in the storage 215 or a combination thereof.

In one embodiment, the one or more functions associated with the at least one augmented reality application are based, at least in part, on the mapping, the one or more executables, the one or more execution strategies, the one or more execution branches, the one or more execution options, or a combination thereof.

In one embodiment, the mapping, the one or more executables, the one or more execution strategies, the one or more execution branches, the one or more execution options, or a combination thereof are determined, at least in part, via the one or more user interface elements such as a launch pad area, a home screen, or a combination thereof.

In one embodiment, per step 507 of FIG. 5A, the digital object generator 201 processes and/or facilitates a processing of the media information to determine one or more anchor points for the one or more digital objects, wherein the anchor points are empty artifacts or place holders for the generated digital objects.

In one embodiment, per step 509 of FIG. 5A the display module 205 causes, at least in part, a rendering of a user interface for presenting the one or more digital objects in an augmented reality display on UI 109a-109i using the anchor points. The user interface may include, at least in part, one or more user interface elements, wherein the digital object modification module 203 can use the user interface elements to cause, at least in part, an initiation of the composition, the decomposition, or a combination thereof by the initiation module 209.

In one embodiment, the one or more user interface elements may include, at least in part, a launch pad area, a home screen, or a combination thereof on the UI 109a-109i to which the one or more digital objects are moved to cause, at least in part, the initiation of the composition, the decomposition, or a combination thereof by the initiation module 209.

In one embodiment, per step 511 of FIG. 5A, the operations module 207 determines at least a portion of the data, the one or more computation closures, the one or more results, or a combination thereof from the one or more user interface elements via one or more bi-directional operations.

In one embodiment, per step 513 of FIG. 5A, the digital object generator 201 causes, at least in part, a creation of one or more other digital objects based, at least in part, on the composition, the decomposition, or a combination thereof.

In one embodiment, per step 515 of FIG. 5A, the digital object modification module 203 causes, at least in part, an execution of the one or more functions via the data, the one or more computation closures, the results, or a combination thereof associated with the one or more digital objects, the one or more other digital objects, or a combination thereof.

In one embodiment, per step 517 of FIG. 5A, the digital object modification module 203 causes, at least in part, a rendering of the one or more other digital objects in the UI 109a-109i for causing, at least in part, an update of the one or more digital objects, the one or more functions, the at least one augmented reality application, or a combination thereof.

In one embodiment, as seen in flowchart 520 of FIG. 5B, the composition, the decomposition or a combination thereof of the one or more digital objects may include, at least in part, one or more projection operations. In this embodiment, per step 529 of FIG. 5B, the projection module 211 determines a subset of one or more information spaces 113a-113m associated with the at least one augmented reality application. Furthermore, per step 531 of FIG. 5B, the projection module 211 determines the one or more digital objects based, at least in part, on the subset.

In one embodiment, as seen in flowchart 520 of FIG. 5B, the composition, the decomposition or a combination thereof of the one or more digital objects may include, at least in part, one or more injection operations. In this embodiment, per step 533 of FIG. 5B, the injection module 213 determines a filtration of the one or more digital objects, one or more other digital objects, or a combination thereof, wherein the one or more other digital objects are determined by one or more projection operations. Furthermore, per step 535 of FIG. 5B, the injection module 213 determines to add the one or more other digital objects to one or more information spaces 113a-113m associated with the at least one augmented reality application based, at least in part, on the filtration.

Additionally, it is noted that, the intermediate and the final data, computation closures and, results, from the process described in FIGS. 5A and 5B may be retrieved and/or stored in storage 215, in data repository 117, in clouds 111a-111n or a combination thereof.

Figure 6A:
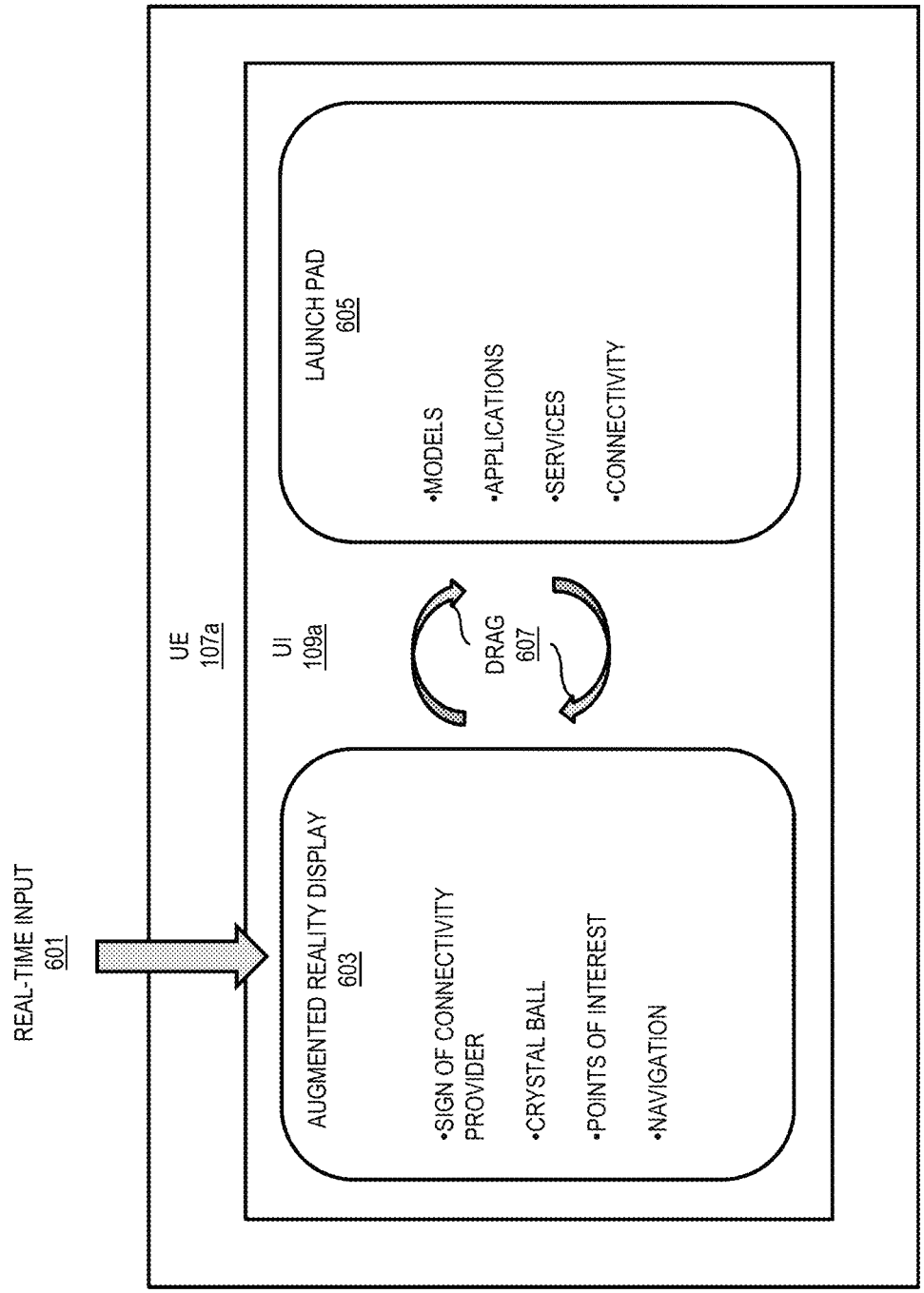
FIGS. 6A-6C are diagrams of user interfaces utilized in the process of FIGS. 1-5B, according to various embodiments.
Figure 6B:
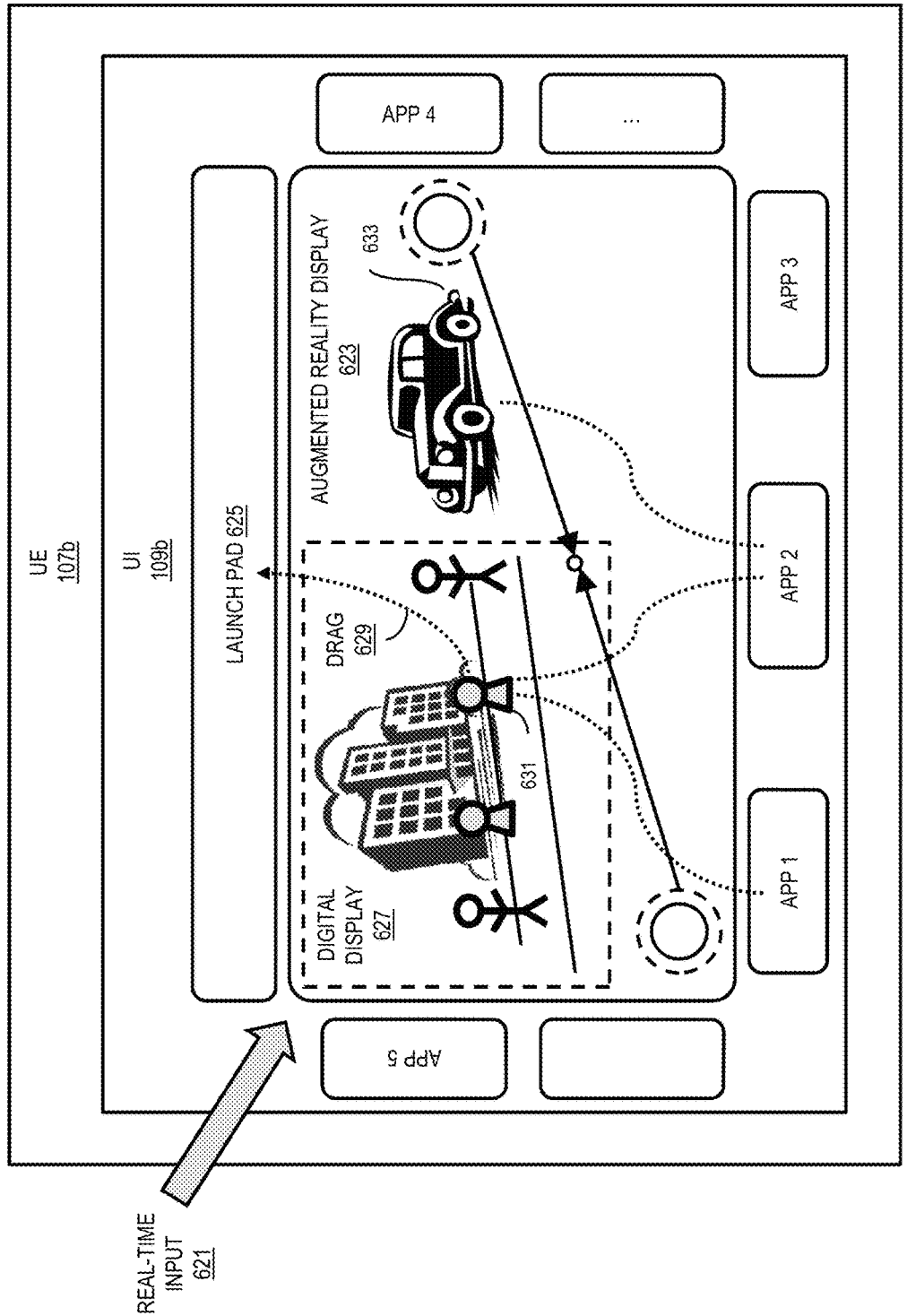
Figure 6C:
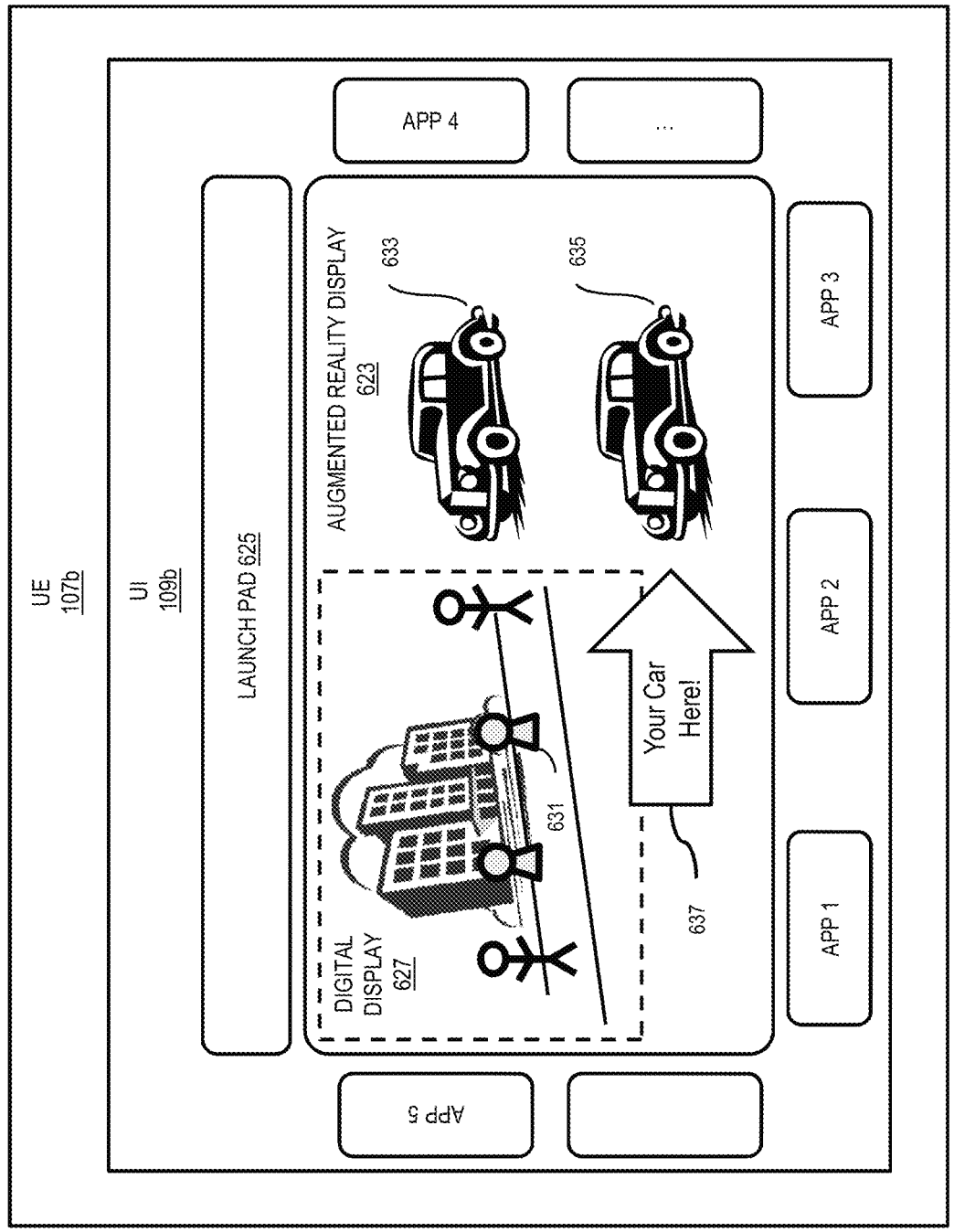

FIGS. 6A-6C are diagrams of user interfaces utilized in the process of FIGS. 1-5B, according to various embodiments.

In one embodiment, as seen in FIG. 6A, a real-time input 601 (e.g. a video stream, an audio stream, one or more still images, etc.) is captured by the UE 107a and entered UI 109a. The mixed reality platform 103 generates digital objects associated with the input and presents the digital objects in the augmented reality display 603. The augmented reality display 603 may also represent functions that can be applied on the digital objects. Some of the functions can be determination of points of interest, navigation, etc. It is noted that the input may be an already recorded media file such as a video file, an audio file, one or more still images, or a combination thereof.

In one embodiment, a user of the UE 107a can drag icons representing digital objects on the augmented reality display 603 into one or more launch pads 605. The dragging is shown by arrows 607.

In one embodiment, a behavioral pattern can be tied to the number of items tapped, or dragged via arrows 607 by a user of UE 107a and mixed reality launch pad 605, or matched to the results of a query by the user.

In one embodiment, the UI 109a of UE 107a may include free form of input query area, a one line search, a query area, a URL link to number of objects, or a combination thereof. A user of UE 107a may want to stick to the country specific device, or access extra services for example with Google translation between different languages and based on run-time settings.

In one embodiment, upon the determination of the functional elements the projection and injection data, including functional elements, are dragged to a launch pad area 605 on the UI 109a for reasoning user and mixed realities to digital composition. A launch pad 605 may have the capability of creating and updating digital objects between the UE 107a and the mixed reality platform 103. Furthermore, the launch pad 605 may provide backend support and expose processes associated with clouds 111a-111n to the functional elements, if needed.

In one embodiment, projection and injection mechanisms consist of a set of actions such as, for example, selecting the focus point from user or mixed reality display 603, tapping the selected object, dragging or moving (607) the object to the launch pad 605, locating the objects from the launch pad 605, or a combination thereof.

FIG. 6B shows a user interfaces utilized in the process of FIGS. 1-5B with a design that is different from the interface of FIG. 6A. In one embodiment, as seen in FIG. 6B, a real-time input 621 (e.g. a video stream, an audio stream, one or more still images, etc.) is captured by the UE 107b and entered UI 109b. The UE 107a displays the input on the digital display 627 while the mixed reality platform 103 generates digital objects associated with the input and presents the digital objects in the augmented reality display 623. In this embodiment, the augmented reality display 623 is an extension of the digital display 627 and the mixed reality platform 103 may provide services to the user of UE 107b to toggle between the digital display 627 and the augmented reality display 623 wherein the digital display 627 shows the objects as they are in the input 621 while the augmented reality display 623 may allow the user to apply various functions on the objects and see the results simultaneously and enable the user to compare the objects before and after the application of functions. As seen in FIG. 6B applications APP1, APP2, APP3, APP4 and APP5 are available on UE 107b wherein APP1 and APP2 are applied on object 631 and APP2 involves objects 631 and 633. It is noted that the input may be an already recorded media file such as a video file, an audio file, one or more still images, or a combination thereof.

In one embodiment, a user of the UE 107b can drag icons representing digital objects on the digital display 627, on the augmented reality display 623, or a combination thereof into one or more launch pads 625. The dragging is shown by arrows 629. The results from applying the applications APP1 and APP2 on object 431 may be presented on the launch pad 625.

In the embodiment of FIG. 6B, the APP2 involves object 631 and the augmented reality object 633. For example, the APP2 may be a mixed reality game using a real object 631 and an augmented reality object 633 played on the launch pad 625.

In various embodiments, the mixed reality platform 103 may enable the user of UE 107b to modify the size, number and location of the digital display 627, the augmented reality display 623, the launch pad 625, or a combination thereof.

FIG. 6C illustrates the user interface of FIG. 6B as used to provide assistance results for proximity navigation based on user behavioral patterns. As shown, FIG. 6C is an example use case in which a user has just exited a store and is now searching for where the user's car is parked. In the augmented reality display 623, there are two digital objects representing two possible cars (e.g., object 633 and object 635) that potentially belong to the user. In this example, the user's car as represented by object 635 is equipped with a smart dashboard that can provide rendering assistance results to the user's device (e.g., UE 107b).

Accordingly, as the user approaches the car, the object 635 (e.g., a source device) determines that approach of the user is compatible a behavioral pattern that indicates the user is searching for his or her car. For example, the behavioral pattern may have been detected or learned according to the various embodiments of the processes described above. The mixed reality platform 103, for instance, may have learned that when a user exits a store and points the UE 107b in the direction of the car object 635, the user is likely to be searching for the car.

On detecting, the behavior pattern the car object 635 can initiate computational processes to provide assistance results to the UE 107b to help locate the car. In this case, the source device (e.g., the smart dashboard of the car) renders assistance to the UE 107b by providing information content that results in display of a digital object 637 in the augmented reality display 627 that points specifically to the car object 635 that the user is searching for.

The processes described herein for providing behavioral pattern generation for mixed reality objects may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
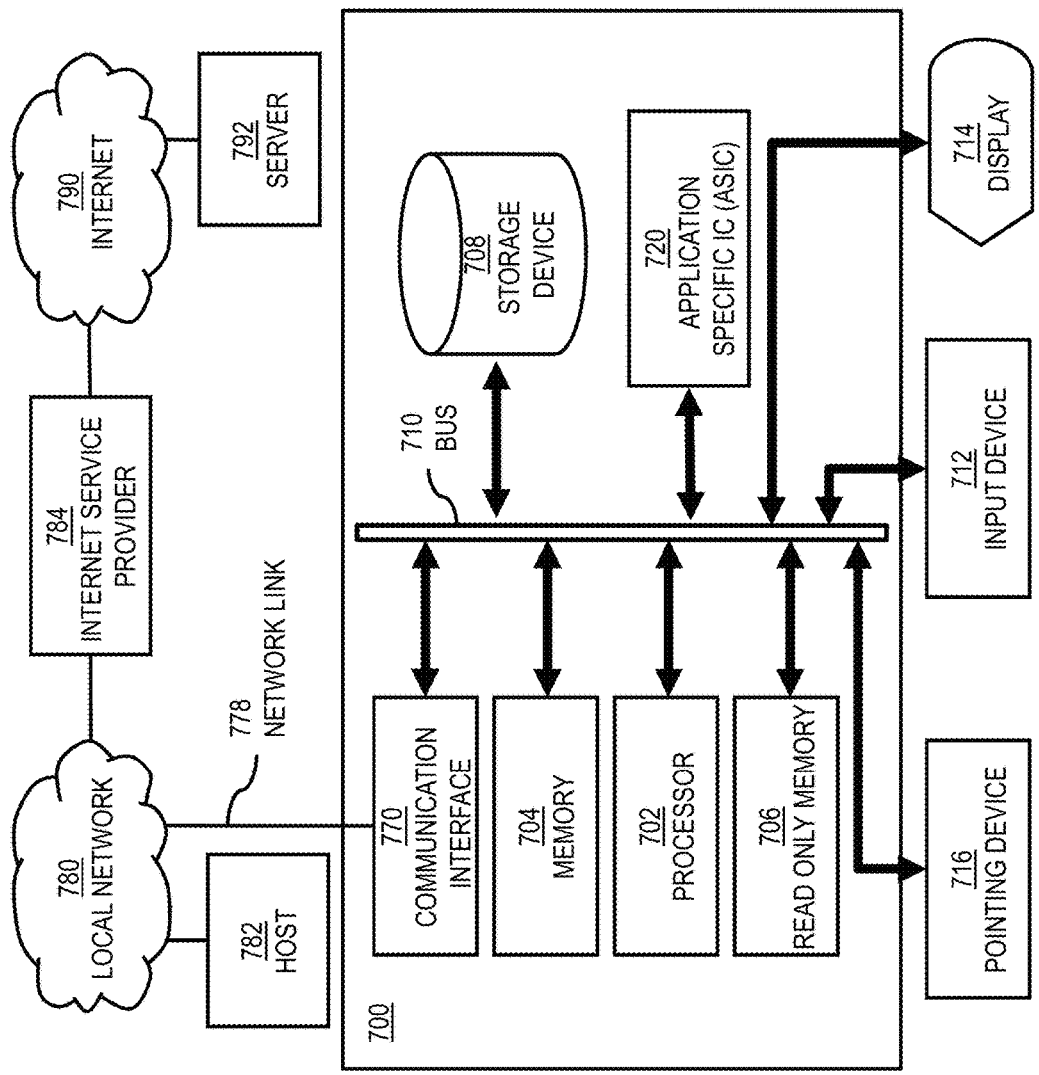
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide behavioral pattern generation for mixed reality objects as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing behavioral pattern generation for mixed reality objects.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing behavioral pattern generation for mixed reality objects. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing behavioral pattern generation for mixed reality objects. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing behavioral pattern generation for mixed reality objects, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing behavioral pattern generation for mixed reality objects.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide behavioral pattern generation for mixed reality objects as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing behavioral pattern generation for mixed reality objects.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide behavioral pattern generation for mixed reality objects. The memory 805 also stores the data associated with or generated by the execution of the inventive steps.

Figure 9:
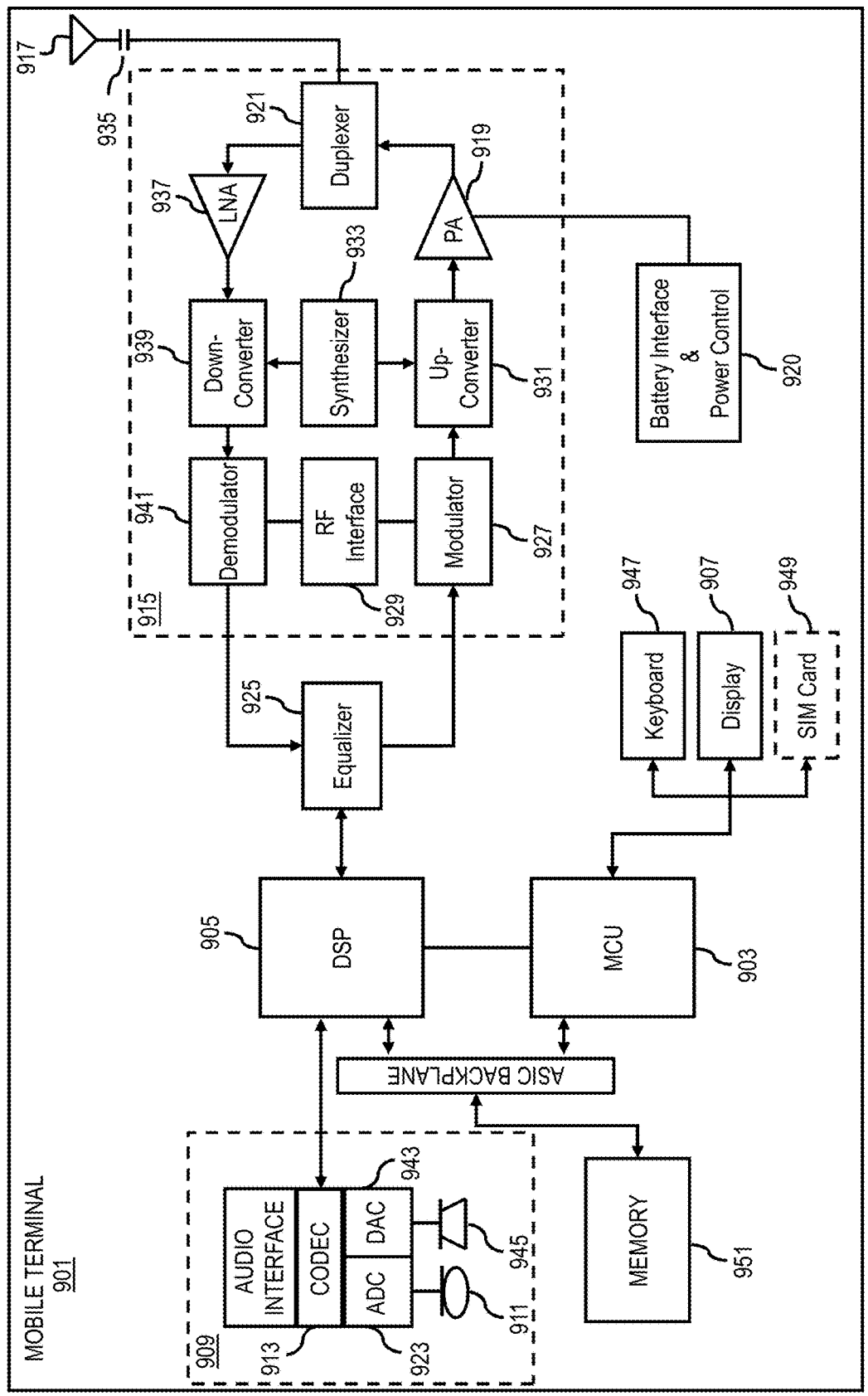
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing behavioral pattern generation for mixed reality objects. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing behavioral pattern generation for mixed reality objects. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide behavioral pattern generation for mixed reality objects. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing behavioral pattern generation for mixed reality objects, the method comprising:
    at least one determination, via a processor comprising a digital object generator, of one or more computation closures for describing one or more user behavioral patterns associated with one or more digital objects of at least one augmented reality information space, wherein the determination of the one or more computation closures comprises projecting the one or more computation closures from the at least one augmented reality information space to represent the one or more digital objects in response to determining one or more triggering events and extracting at least one subset of information associated with the one or more digital objects from the at least one augmented reality information space, and wherein the one or more digital objects aggregate, at least in part, the one or more computation closures, data acted on by the one or more computation closures, one or more results of the one or more computation closures, or a combination thereof, wherein the one or more user behavioral patterns are computed based on one or more serialized computational sequences entailed in the one or more digital objects, grounded with terminations and injected into the at least one augmented reality information space; and
    a processing, via the processor comprising the digital object generator, of one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

2. The method of claim 1, further comprising:
    a creation of at least one run-time information space based, at least in part, on the one or more digital objects; and
    an entailing of the one or more user behavioral patterns, description information associated with the one or more user behavioral patterns, or a combination thereof with the one or more digital objects in the at least one run-time information space.

3. The method of claim 1, further comprising:
    a traversal of the one or more computation closures to detect the one or more user behavioral patterns in the one or more interactions; and
    an extraction of the data, the one or more computations, or a combination thereof associated with the detected one or more user behavioral patterns from the augmented reality information space.

4. The method of claim 1, further comprising:
    at least one determination of one or more characteristics of one or more items in at least one view of one or more augmented reality applications associated with the at least one augmented reality information space; and
    at least one determination of the one or more digital objects to make available based, at least in part, on the one or more characteristics, the one or more user behavioral patterns, or a combination thereof.

5. The method of claim 4, wherein the one or more interactions include, at least in part, a number of times the one or more items are tapped, dragged, viewed, focused upon, queried, or a combination thereof.

6. The method of claim 1, wherein the one or more user behavioral patterns, the one or more interactions, or a combination thereof are associated with one or more users, one or more groups of users, or a combination thereof.

7. The method of claim 1, further comprising:
    a processing of the one or more user behavioral patterns to determine at least one assistance function with respect to the one or more digital objects between at least one device and at least one other device.

8. The method of claim 7, further comprising:
    at least one determination of the at least one assistance function based, at least in part, on contextual information associated with the at least one device, the at least one other device, or a combination thereof,
    wherein the at least one assistance function includes, at least in part, proximity navigation information associated with the one or more digital objects, the at least one device, the at least one other device, or a combination thereof.

9. The method of claim 7, further comprising:
    at least one determination of spatial relationship information between the at least one device and the at least one other device; and
    at least one determination of the at least one assistance function, a presentation of the one or more digital objects, or a combination thereof based, at least in part, on the spatial relationship.

10. The method of claim 7, wherein the at least one device, the at least one other device, or a combination thereof include, at least in part, one or more dashboard devices, one or more in-vehicle navigation devices, one or more mobile devices, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
        determine one or more computation closures for describing one or more user behavioral patterns associated with one or more digital objects of at least one augmented reality information space, wherein the determination of the one or more computation closures comprises projecting the one or more computation closures from the at least one augmented reality information space to represent the one or more digital objects in response to determining one or more triggering events and extracting at least one subset of information associated with the one or more digital objects from the at least one augmented reality information space, wherein the one or more digital objects aggregate, at least in part, the one or more computation closures, data acted on by the one or more computation closures, one or more results of the one or more computation closures, or a combination thereof, wherein the one or more user behavioral patterns are computed based on one or more serialized computational sequences entailed in the one or more digital objects, grounded with terminations and injected into the at least one augmented reality information space; and process one or more interactions with the one or more digital objects, one or more augmented reality applications associated with the at least one augmented reality information space, or a combination thereof to cause, at least in part, a determination of (a) the one or more user behavioral patterns from the one or more interactions, (b) the data acted on by the one or more computation closures, or (c) a combination thereof.

12. An apparatus of claim 11, wherein the apparatus is further caused to:
cause, at least in part, a creation of at least one run-time information space based, at least in part, on the one or more digital objects; and
cause, at least in part, an entailing of the one or more user behavioral patterns, description information associated with the one or more user behavioral patterns, or a combination thereof with the one or more digital objects in the at least one run-time information space.

13. An apparatus of claim 11, wherein the apparatus is further caused to:
cause, at least in part, a traversal of the one or more computation closures to detect the one or more user behavioral patterns in the one or more interactions; and
cause, at least in part, an extraction of the data, the one or more computations, or a combination thereof associated with the detected one or more user behavioral patterns from the augmented reality information space.

14. An apparatus of claim 11, wherein the apparatus is further caused to:
determine one or more characteristics of one or more items in at least one view of one or more augmented reality applications associated with the at least one augmented reality information space; and determine the one or more digital objects to make available based, at least in part, on the one or more characteristics, the one or more user behavioral patterns, or a combination thereof.

15. An apparatus of claim 14, wherein the one or more interactions include, at least in part, a number of times the one or more items are tapped, dragged, viewed, focused upon, queried, or a combination thereof.

16. An apparatus of claim 11, wherein the one or more user behavioral patterns, the one or more interactions, or a combination thereof are associated with one or more users, one or more groups of users, or a combination thereof.

17. An apparatus of claim 11, wherein the apparatus is further caused to:
process and/or facilitate a processing of the one or more user behavioral patterns to determine at least one assistance function with respect to the one or more digital objects between at least one device and at least one other device.

18. An apparatus of claim 17, wherein the apparatus is further caused to:
determine the at least one assistance function based, at least in part, on contextual information associated with the at least one device, the at least one other device, or a combination thereof,
wherein the at least one assistance function includes, at least in part, proximity navigation information associated with the one or more digital objects, the at least one device, the at least one other device, or a combination thereof.

19. An apparatus of claim 17, wherein the apparatus is further caused to:
determine spatial relationship information between the at least one device and the at least one other device; and
determine the at least one assistance function, a presentation of the one or more digital objects, or a combination thereof based, at least in part, on the spatial relationship.

20. An apparatus of claim 17, wherein the at least one device, the at least one other device, or a combination thereof include, at least in part, one or more dashboard devices, one or more in-vehicle navigation devices, one or more mobile devices, or a combination thereof.

* * * * *